(12) United States Patent
Kim (10) Patent No.: US 8,270,482 B2
(45) Date of Patent: Sep. 18, 2012

(54) METHOD AND APPARATUS FOR ENCODING AND DECODING MULTI-VIEW VIDEO TO PROVIDE UNIFORM PICTURE QUALITY

(75) Inventor: Myung-ho Kim, Songpa-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1602 days.

(21) Appl. No.: 11/706,997

(22) Filed: Feb. 16, 2007

(65) Prior Publication Data

US 2007/0211796 A1    Sep. 13, 2007

Related U.S. Application Data

(60) Provisional application No. 60/780,351, filed on Mar. 9, 2006.

(30) Foreign Application Priority Data

Apr. 27, 2006 (KR) ........................ 10-2006-0038332

(51) Int. Cl.
*H04N 7/12* (2006.01)
(52) U.S. Cl. ......... 375/240.12; 375/240.01; 375/240.16; 382/232; 382/233; 382/236
(58) Field of Classification Search ............. 375/240.01, 375/240.12, 240.16, 240.26; 345/419, 427; 382/232, 233, 236
See application file for complete search history.

(56) References Cited

U.S. PATENT DOCUMENTS

| | | | |
|---|---|---|---|
| 7,119,805 B2 * | 10/2006 | Batori et al. | 345/419 |
| 2003/0202592 A1 | 10/2003 | Sohn et al. | |
| 2006/0222079 A1 * | 10/2006 | Park et al. | 375/240.16 |
| 2007/0030897 A1 * | 2/2007 | Ito | 375/240.12 |
| 2007/0147502 A1 * | 6/2007 | Nakamura | 375/240.12 |
| 2008/0089405 A1 * | 4/2008 | Cho et al. | 375/240.01 |

FOREIGN PATENT DOCUMENTS

CN    1450816 A    10/2003

(Continued)

OTHER PUBLICATIONS

Kimata, Hideaki et al. "System Design of Free viewpoint Video Communication" Proceedings of the Fourth International Conference on Computer and Information Technology, Sep. 14, 2009, p. 52-59, XP003012676.

(Continued)

*Primary Examiner* — Thanhnga B Truong
(74) *Attorney, Agent, or Firm* — Sughrue Mion, PLLC (57) ABSTRACT

Provided are a method and apparatus for encoding and decoding multi-view video to provide uniform picture quality at different viewpoints. The multi-view video encoding method includes selecting a set of referenced viewpoint video frames referred to by different viewpoint video frames, from among received multi-view video frames; encoding the multi-view video on the basis of the set of referenced viewpoint video frames; determining whether a condition for changing the set of referenced viewpoint video frames is satisfied; and if the condition is satisfied, changing the set of referenced viewpoint video frames, and encoding the multi-view video on the basis of the changed set of referenced viewpoint video frames. According to the present invention, it is possible to provide multi-view video in which degrees of video quality deterioration at different viewpoints are uniformly distributed with respect to a long time.

22 Claims, 6 Drawing Sheets

FOREIGN PATENT DOCUMENTS

| | | |
|---|---|---|
| CN | 1568015 A | 1/2005 |
| JP | 07143494 A | 6/1995 |
| JP | 09-261653 A | 10/1997 |
| WO | 2005011285 A1 | 2/2005 |
| WO | 2006019093 A1 | 2/2006 |
| WO | 2006075844 A1 | 7/2006 |
| WO | 2007/043775 A1 | 4/2007 |

OTHER PUBLICATIONS

Text of the First Office Action dated May 10, 2010, issued in counterpart Chinese Application No. 200780006388.4.

Communication dated Dec. 20, 2011 issued by Japanese Patent Office in counterpart Japanese Application No. 2008-558180.

Communication dated Dec. 8, 2011 issued by the State Intellectual Property Office of P.R. China in counterpart Chinese Patent Application No. 200780006388.4.

Communication from the Japanese Patent Office dated Jul. 24, 2012, in a counterpart application No. 2008-558180.

\* cited by examiner

FIG. 9

METHOD AND APPARATUS FOR ENCODING AND DECODING MULTI-VIEW VIDEO TO PROVIDE UNIFORM PICTURE QUALITY

CROSS-REFERENCE TO RELATED PATENT APPLICATION

This application claims the priority from Korean Patent Application No. 10-2006-0038332, filed on Apr. 27, 2006, in the Korean Intellectual Property Office, and the benefit of U.S. Provisional Patent Application No. 60/780,351, filed on Mar. 9, 2006, in the U.S. Patent and Trademark Office, the disclosures of which are incorporated herein in their entirety by referenced.

BACKGROUND OF THE INVENTION

1. Field of the Invention

The present invention relates to a method and apparatus for encoding and decoding multi-view video, and more particularly, to a method and apparatus for encoding and decoding multi-view video to provide uniform picture quality with respect to different viewpoints.

2. Description of the Related Art

Figure 1:
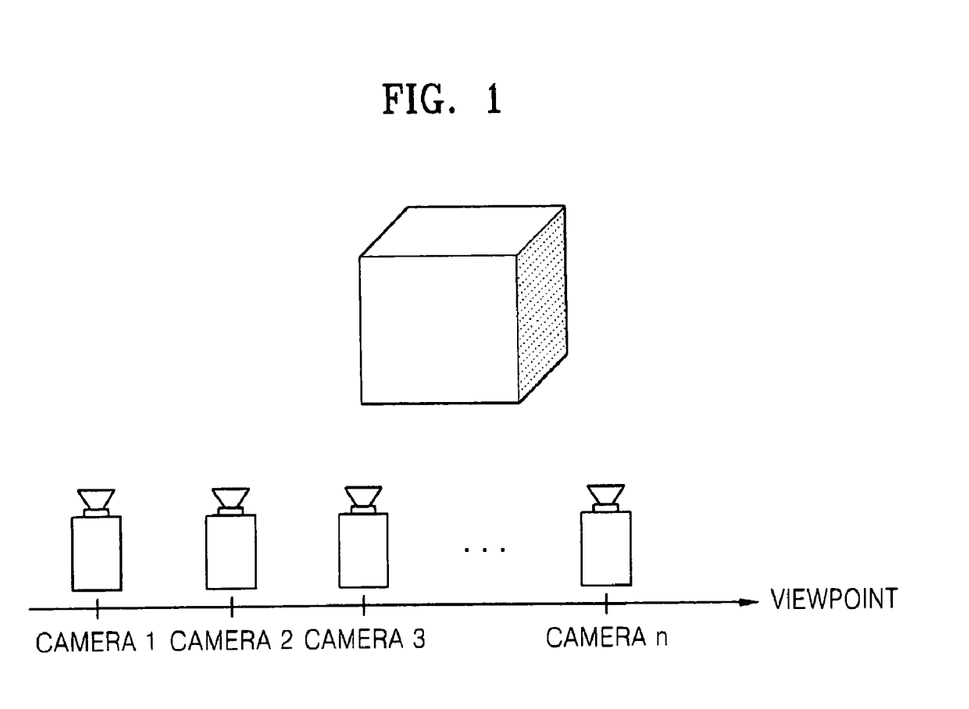
FIG. 1 illustrates an example of a multi-view video input system.

FIG. 1 illustrates an example of a multi-view video input system.

As illustrated in FIG. 1, multi-view video is a plurality of video frames taken by and received from a plurality of cameras, each of which is at a different viewpoint. Accordingly, an apparatus for encoding multi-view video receives a plurality of video frames taken at different viewpoints from a plurality of cameras. Accordingly, multi-view video generally requires a large amount of data storage space, and compression-encoding is essential in order to effectively provide three-dimensional (3D) services using multi-view video.

Recently, as a standard for multi-view encoding, a motion video experts group 2 multi-view profile (MPEG-2 MVP) was proposed. Also, the MPEG is a work group that prepares the 3D-AV standards. The MPEG-2 MVP standard is limited in use to stereo video, while the MPEG 3D-AV standard has been prepared to standardize encoding multi-view video corresponding to camera arrays, such as 1-D parallel, 2-D parallel, 1-D arc, etc.

Figure 2:
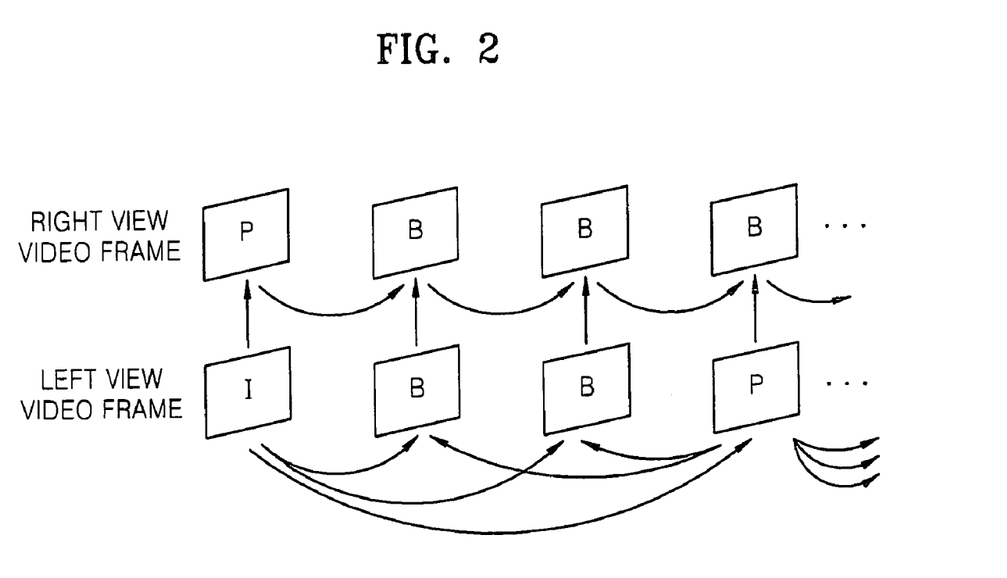
FIG. 2 is a view for explaining an example to which the MPEG-2 MVP standard is applied.

FIG. 2 is a view for explaining an example to which the MPEG-2 MVP is applied.

According to the MPEG-2 MVP standard, when 3D video is encoded using a left view video frame and a right view video frame, the 3D video is encoded and reproduced using a scalable codec for detecting correlation between the two video frames and variably encoding a difference between the two video frames according to a network status. Here, the encoding is performed under an assumption that the left view video frame is a base layer video frame and the right view video frame is an enhancement layer video frame. The base layer video frame is a video frame which can be encoded using only its own information, and the enhancement layer video frame is a video frame which is additionally encoded and transmitted in order to enhance the picture quality of the base layer video frame when the network is stable. As such, encoding using base layer video frames and enhancement layer video frames is called "scalable coding".

In FIG. 2, the left view video frame, which is a base layer video frame, is encoded by a method such as the existing main profile, without using disparity information of video frames taken at different viewpoints. That is, the left view video frame is encoded using intra coding and motion compensation coding in order to reduce spatial and temporal redundancy. Meanwhile, the right view video frame is encoded by performing disparity estimation on the left view video frame and performing motion estimation on a right view video frame. However, since the MPEG-2 MVP specification does not consider an encoder for encoding multi-view video, the MPEG-2 MVP specification is not actually suitable for multi-view video. Therefore, an encoder for efficiently providing multi-view video in order to simultaneously provide a stereoscopic effect and realism to a plurality of people is necessary.

SUMMARY OF THE INVENTION

The present invention provides a method and apparatus for efficiently encoding and decoding multi-view video to provide uniform picture quality with respect to video frames taken at different viewpoints.

According to an aspect of the present invention, there is provided a method for encoding multi-view video including: selecting a set of referenced viewpoint video frames referred to by different viewpoint video frames, from among received multi-view video frames; encoding the multi-view video on the basis of the set of referenced viewpoint video frames; determining whether a condition for changing the set of referenced viewpoint video frames is satisfied; if the condition is satisfied, changing the set of referenced viewpoint video frames; and encoding the multi-view video on the basis of the changed set of referenced viewpoint video frames.

According to another aspect of the present invention, there is provided an apparatus for encoding multi-view video including: a referenced viewpoint video selecting unit selecting a set of referenced viewpoint video frames referred to by different viewpoint video frames, from among received multi-view video frames; an encoding unit encoding the multi-view video on the basis of the set of referenced viewpoint video frames; and a condition determining unit determining whether a condition for changing the set of referenced viewpoint video frames is satisfied, wherein, if the condition determining unit determines that the condition is satisfied, the referenced viewpoint video selecting unit changes the set of referenced viewpoint video frames, and the encoding unit encodes the multi-view video on the basis of the changed set of referenced viewpoint video frames.

According to another aspect of the present invention, there is provided a method for decoding multi-view videos, including: receiving a referenced viewpoint video bit stream and an non-referenced viewpoint video bit stream including information regarding referenced viewpoint video frames; decoding the referenced viewpoint video bit stream; and performing disparity estimation on the referenced viewpoint video frames indicated by the information regarding the referenced viewpoint video frames, thereby decoding the non-referenced viewpoint video bit stream, wherein the information regarding the referenced viewpoint video frames included in the non-referenced viewpoint video bit stream comprises referenced viewpoint identifiers of referenced viewpoint video frames referred to by respective non-referenced viewpoint video frames, and is changed on the basis of a predetermined amount of time.

According to another aspect of the present invention, there is provided an apparatus for decoding multi-view video, including: a referenced viewpoint video decoding unit receiving and decoding a referenced viewpoint video bit stream; and an non-referenced viewpoint video decoding unit receiving an non-referenced viewpoint video bit stream including information regarding referenced viewpoint video frames, and performing disparity estimation on the referenced viewpoint video frames indicated by the information regarding the referenced viewpoint video frames, thereby decoding the non-referenced viewpoint video bit stream, wherein the information regarding the referenced viewpoint video frames included in the non-referenced viewpoint video bit stream comprises referenced viewpoint identifiers of referenced viewpoint video frames referred to by respective non-referenced viewpoint video frames, and is changed on the basis of a predetermined amount of time.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, embodiments of the present invention will be described in detail with reference to the appended drawings.

In this specification, a video frame at a viewpoint, on which intra and inter encoding is performed using only information regarding its own viewpoint, is referred to as a referenced viewpoint video frame, and a video frame, which is encoded using disparity estimation with respect to a reference viewpoint video frame, is referred to as a non-reference viewpoint video frame.

Figure 3:
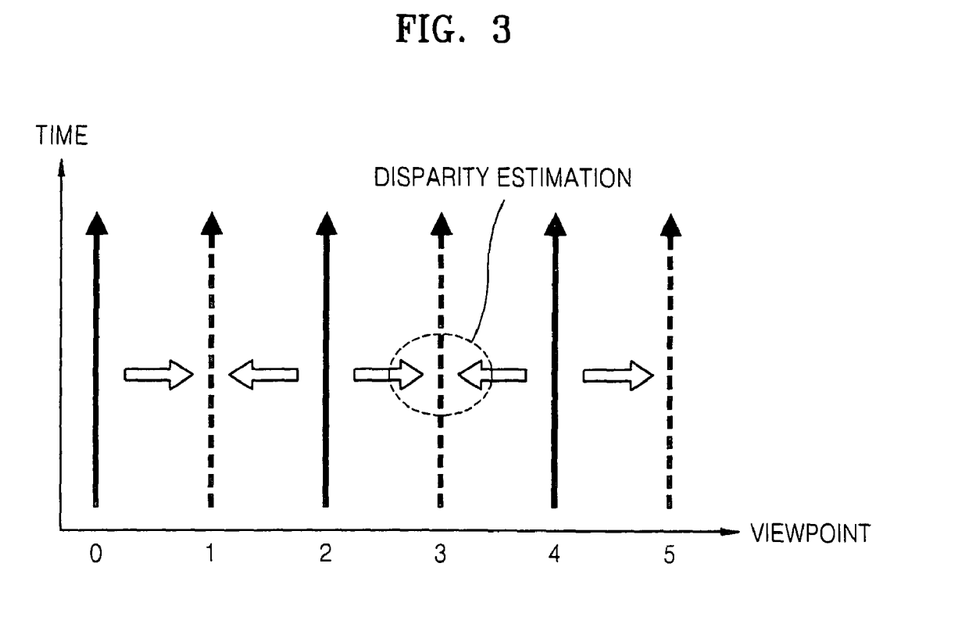
FIG. 3 is a view for explaining encoding of multi-view video consisting of 6 viewpoints.

FIG. 3 is a view for explaining encoding of multi-view video consisting of 6 viewpoints.

Referring to FIG. 3, video frames at viewpoints 0, 2, and 4 are a set of referenced viewpoint video frames which are encoded by intra and inter encoding using only video information regarding their own viewpoints. Video frames at viewpoints 1, 3, and 5 are a set of non-reference viewpoint video frames obtained by performing encoding including disparity estimation from neighboring referenced viewpoint video frames. Considering arrows denoted in FIG. 3, the video frame at viewpoint 1 is obtained by performing disparity estimation and encoding by referring to the video frames at viewpoints 0 and 2. The video frame at viewpoint 3 is obtained by performing disparity estimation and encoding by referring to the video frame at viewpoints 2 and 4. The video frame at viewpoint 5 is obtained by performing disparity estimation and encoding by referring to the video frame at viewpoint 4.

For example, in order to obtain the video frame at viewpoint 5, a disparity vector is decided with reference to the video frame at the neighboring viewpoint 4. Then, a reconstructed video frame for the video frame at viewpoint 5 is created using the decided disparity vector, and a difference value between an original video frame taken at viewpoint 5 and the reconstructed video frame can be encoded. When the video frame at viewpoint 5 is encoded, inter encoding can be further performed on video frames at their own viewpoints, in addition to using disparity estimation.

As such, by encoding video frames taken at predetermined viewpoints with reference to video frames taken at different viewpoints, instead of independently encoding video frames taken at respective viewpoints, the bandwidth for transferring images of entire viewpoints can be reduced. The number of multi-view video frames, the number and positions of referenced viewpoint video frames, the number of non-referenced viewpoint video frames subjected to disparity estimation, and the viewpoints of video frames referred to by respective non-referenced viewpoint video frames for disparity estimation, can vary.

However, if referenced viewpoints are fixed, as illustrated in FIG. 3, the peak signal to noise ratio (PSNR) difference according to time between video frames at respective viewpoints will occur. Although encoding methods for enhancing the PSNR are being researched, picture quality is limited to a level which can be achieved by a simulcast encoding method which independently encodes video frames taken at different viewpoints.

If the PSNR difference according to time between the video frames at the respective viewpoints is not uniform, when the viewpoint video frames are decoded, the degrees of video quality deterioration between the decoded viewpoint video frames become different from each other. This means that distribution of video information at different viewpoints becomes unbalanced. This results in a non-uniform distribution of video information at different viewpoints. Accordingly, there exists a video frame of a viewpoint having a high degree of video quality deterioration and greatly different, relatively, from its original video frame, compared to referenced viewpoint video frames. If a user selects a viewpoint having such a high degree of video quality deterioration from among multi-view video frames, a video frame which is significantly different from its original video frame, compared to referenced viewpoint video frames, will be provided to the user.

Figure 4:
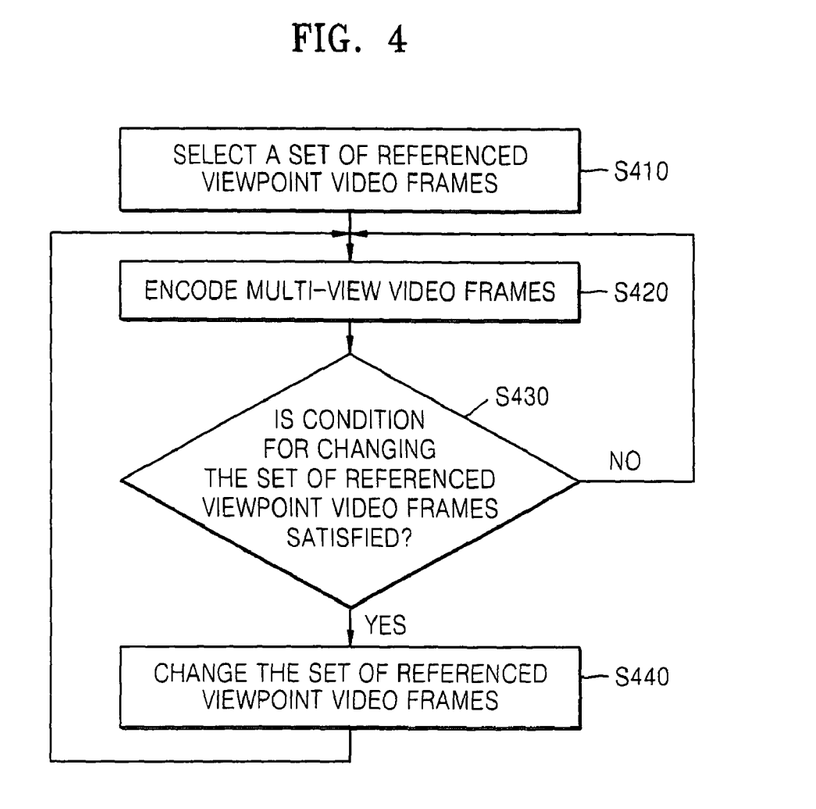
FIG. 4 is a flowchart illustrating a multi-view video encoding method of providing uniform picture quality, according to an exemplary embodiment of the present invention.

FIG. 4 is a flowchart illustrating a method of encoding multi-view video to provide uniform picture quality, according to an embodiment of the present invention.

Referring to FIG. 4, in operation S410, a set of referenced viewpoint video frames, which are to be used as referenced viewpoint video frames of different viewpoint video frames, among received multi-view video frames, is selected.

Then, in operation S420, multi-view video is encoded on the basis of the set of referenced viewpoint video frames. The set of referenced viewpoint video frames is encoded using frames at their own viewpoints and is created as a referenced viewpoint video bit stream. Then, the remaining viewpoint video frames which are not selected as the set of referenced viewpoint video frames are selected as a set of non-referenced viewpoint video frames. The set of non-referenced viewpoint video frames is encoded using disparity vectors with respect to the referenced viewpoint video frames, and is created as an non-referenced viewpoint video bit stream. When the set of non-referenced viewpoint video frames is encoded, information regarding referenced viewpoint video frames referred to by the respective non-referenced viewpoint video frames is added to become the non-referenced viewpoint video bit stream. For example, a method of adding referenced viewpoints information referred to by non-referenced viewpoint video frames to the syntax of the corresponding non-referenced viewpoint video bit stream, can be used. Accordingly, the set of the non-referenced viewpoint video frames can be decoded using the information regarding the referenced viewpoint video frames included in the non-referenced viewpoint video bit stream.

Then, in operation S430, it is determined whether a condition for changing the set of referenced viewpoint video frames is satisfied. This operation is performed to prevent picture quality imbalance between referenced viewpoint video frames and non-referenced viewpoint video frames from being fixed. In operation S430, the determination of whether the condition for changing the set of the referenced viewpoint video frames is satisfied is performed by determining whether a predetermined amount of time elapses. The predetermined amount of time may be a predetermined time unit, a sequence unit, a Group of Pictures (GOP) unit, or a picture unit, however, the present invention is not limited to these.

If the condition is satisfied in operation S430, in operation S440, the set of referenced viewpoint video frames changes. In operation S440, the set of referenced viewpoint video frames can be changed sequentially or arbitrarily. After the set of referenced viewpoint video frames changes, the process returns to operation S420. That is, the multi-view video is encoded on the basis of the changed set of referenced viewpoint video frames.

Figure 5:
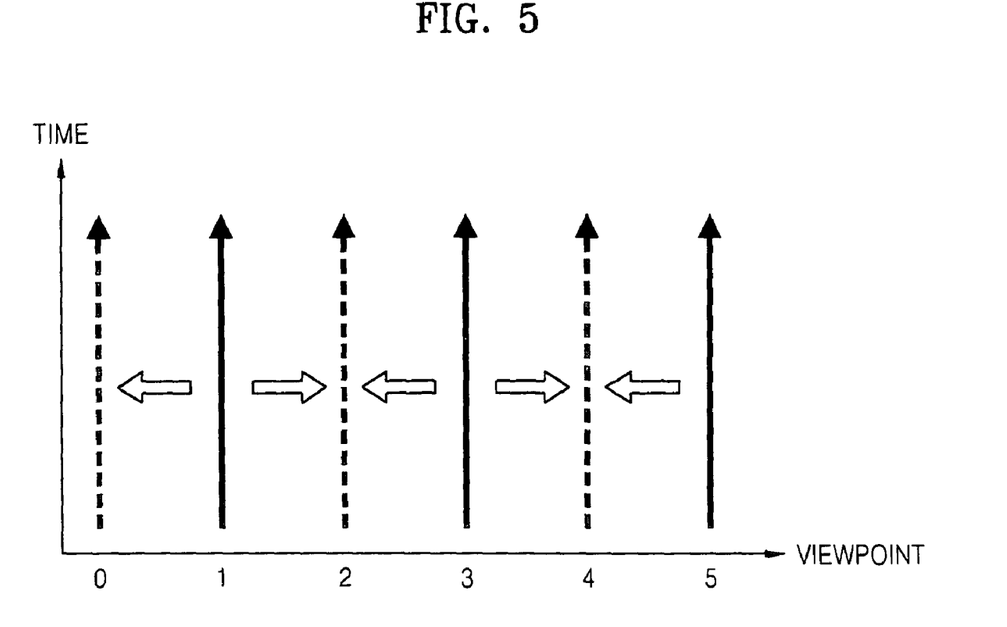
FIG. 5 is a view for explaining multi-view video encoding according to an exemplary embodiment of the present invention.

FIG. 5 is a view for explaining multi-view video encoding which provides uniform picture quality, according to an embodiment of the present invention.

As described above with reference to FIG. 4, according to an embodiment of the present invention, in order to allow multi-view video frames at different viewpoints to have uniform picture quality, multi-view video frames are encoded using a method in which a set of referenced viewpoint video frames changes if a predetermined condition is satisfied. For example, if an initial set of referenced viewpoint video frames corresponds to viewpoints 0, 2, and 4, as illustrated in FIG. 3, the set of referenced viewpoint video frames changes to a set of referenced viewpoint video frames corresponding to viewpoints 1, 3, and 5, as illustrated in FIG. 5, if a predetermined condition is satisfied, and the set of referenced viewpoint videos corresponding to the viewpoints 1, 3, and 5 is selected.

For example, if the predetermined condition is a GOP, the predetermined condition is not satisfied until a GOP is encoded. In this case, the multi-view video is encoded on the basis of the previously selected set of referenced viewpoint video frames. If the GOP is completely encoded, since the predetermined condition is satisfied, the set of referenced viewpoint video frames is changed to the set of referenced viewpoint video frames corresponding to the viewpoints 0, 2, and 4, and the set of referenced viewpoint video frames corresponding to the viewpoints 0, 2, and 4 is selected. Then, the multi-view video is encoded on the basis of the changed set of referenced viewpoint video frames. Meanwhile, when a non-referenced viewpoint video frame is encoded, for example, in FIG. 5, when the video frame at the viewpoint 2 is encoded, an encoded bit stream of the video frame at the viewpoint 2 includes information indicating that referenced viewpoints are viewpoints 1 and 3.

Figure 6A:
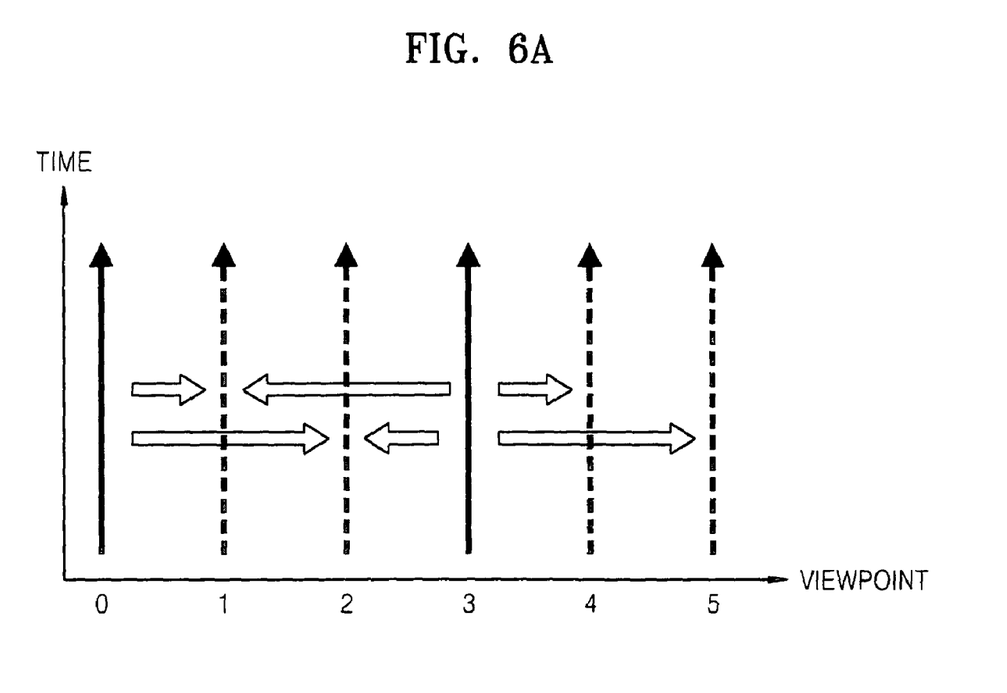
FIGS. 6A, 6B, and 6C are views for explaining multi-view video encoding which provides uniform picture quality, according to another exemplary embodiment of the present invention.
Figure 6B:
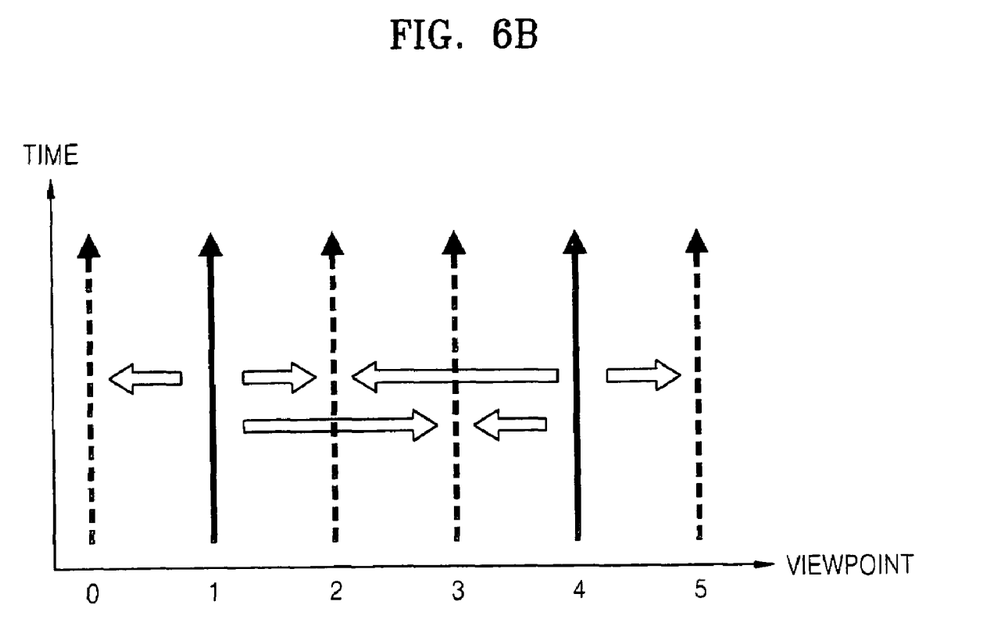
Figure 6C:
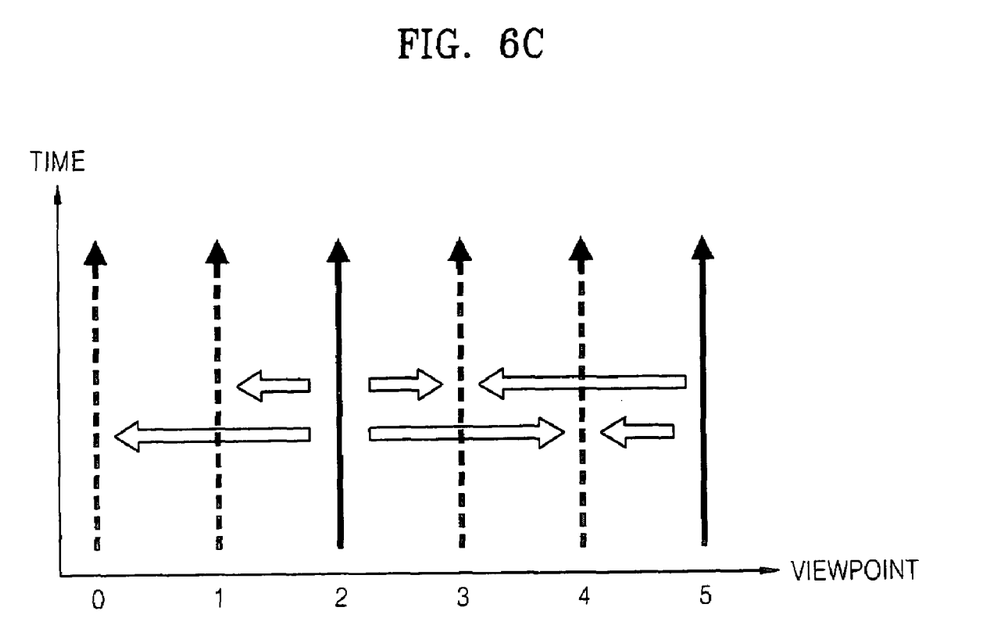

FIGS. 6A, 6B, and 6C are views for explaining multi-view video encoding which provides uniform picture quality, according to another embodiment of the present invention.

FIGS. 6A, 6B, and 6C illustrate an example in which the number of referenced viewpoint video frames is 2. Referring to FIG. 6A, an initial set of referenced viewpoint video frames corresponds to viewpoints 0 and 3. The video frames taken at the viewpoints 0 and 3 are encoded by intra and inter encoding using only their own viewpoint information, without performing disparity estimation on video frames taken at different viewpoints. Video frames taken at viewpoints 1, 2, 4, and 5 are encoded by performing disparity estimation on the video frames taken at the viewpoints 0 and 3. For example, as illustrated in FIG. 6A, the video frame taken at the viewpoint 1 is encoded by performing disparity estimation on the video frames taken at the referenced viewpoints 0 and 3.

Then, it is determined whether a predetermined condition for changing the set of referenced viewpoint video frames is satisfied. For example, if the predetermined condition is an interval of a GOP, the set of referenced viewpoint video frames is changed when a GOP is completely encoded. The set of referenced viewpoint video frames can be changed sequentially or arbitrarily and the changed result is selected. When an initial set of referenced viewpoint video frames corresponds to the viewpoints 0 and 3, the initial set of referenced view point can be changed arbitrarily to the viewpoints 1 and 2 or to the viewpoints 1 and 5 and the changed viewpoints are selected.

Hereinafter, a method for sequentially changing a set of referenced viewpoint video frames is described. Referring to FIG. 6B, viewpoints 1 and 4 are selected as referenced viewpoints. Accordingly, video frames taken at the referenced viewpoints 1 and 4 are encoded by performing intra and inter encoding on their own viewpoint video frames, and video frames taken at the remaining viewpoints 0, 2, 3, and 5 are encoded by performing disparity estimation on the video frames taken at the referenced viewpoints 1 and 4.

If a GOP is completely encoded, as illustrated in FIG. 6C, the video frames taken at the viewpoints 2 and 5 are selected as a set of reference viewpoint video frames. While a GOP is encoded starting from the changed set of referenced viewpoint video frames, the video frames taken at the viewpoints 2 and 5 are encoded by performing intra and inter encoding on their own viewpoint video frames, and the video frames taken at the remaining viewpoints 0, 1, 3, and 4 are encoded by performing disparity estimation on the video frames taken at the referenced viewpoints 2 and 5.

Figure 7:
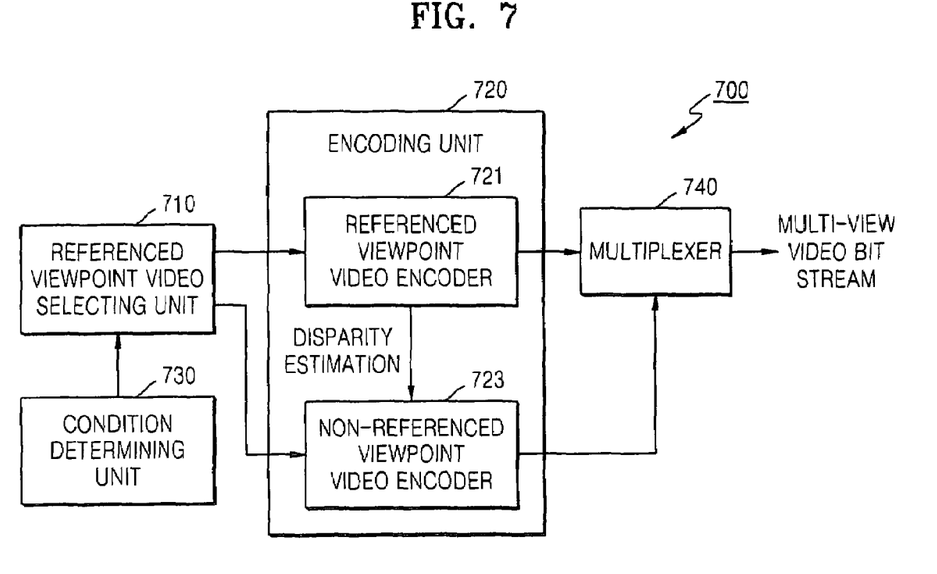
FIG. 7 is a block diagram of a multi-view video encoding apparatus for providing uniform picture quality, according to an exemplary embodiment of the present invention.

FIG. 7 is a block diagram of a multi-view video encoding apparatus 700 for providing uniform picture quality, according to an embodiment of the present invention.

The multi-view video encoding apparatus 700 includes a referenced viewpoint video selector 710, an encoding unit 720, a condition determining unit 730, and a multiplexer 740.

The referenced viewpoint video selector 710 selects a set of referenced viewpoint video frames which will be used as referenced video frames of different viewpoint video frames when encoding is performed, from among received multi-view video frames. The encoding unit 720 encodes multi-view video on the basis of the selected set of referenced viewpoint video frames.

The condition determining unit 730 determines whether a condition for changing the set of referenced viewpoint video frames is satisfied. The condition determining unit 730 determines whether the condition is satisfied by determining whether a predetermined amount of time elapses. The predetermined amount of time may be a predetermined time unit, a sequence unit, a GOP unit, or a picture unit, however, the present invention is not limited to these.

If the condition determining unit 730 determines that the condition is satisfied, a signal indicating that the condition is satisfied is transferred to the referenced viewpoint video selector 710. The referenced viewpoint video selector 710 changes the set of referenced viewpoint video frames in response to the signal received from the condition determining unit 730. The referenced viewpoint video selector 710 can include a counter (not shown) or a random number generator (not shown) to sequentially or arbitrarily change referenced viewpoint video frames.

The encoding unit 720 can include a referenced viewpoint video encoder 721 and an non-referenced viewpoint video encoder 723 to encode referenced viewpoint video frames and non-referenced viewpoint video frames, respectively. The referenced viewpoint encoder 721 encodes the set of the referenced viewpoint video frames and creates a referenced viewpoint video bit stream, wherein the respective referenced viewpoint video frames are encoded using frames at their own viewpoints. The non-referenced viewpoint video encoder 723 encodes non-referenced viewpoint video frames using disparity vectors with respect to the set of referenced viewpoint video frames. When encoding the non-referenced viewpoint video frames, the non-referenced viewpoint video encoder 723 adds information regarding referenced viewpoint video frames to create an non-referenced viewpoint video bit stream. The information regarding the referenced viewpoint video frames may be referenced viewpoint identifier information referred to by the respective non-referenced viewpoint video frames.

The referenced viewpoint video bit stream created by the referenced viewpoint video encoder 721 and the non-referenced viewpoint video bit stream created by the non-referenced viewpoint video encoder 723 can be independently transmitted to a decoding terminal or can be transmitted to the decoding terminal after being multiplexed by the multiplexer 740.

Figure 8:
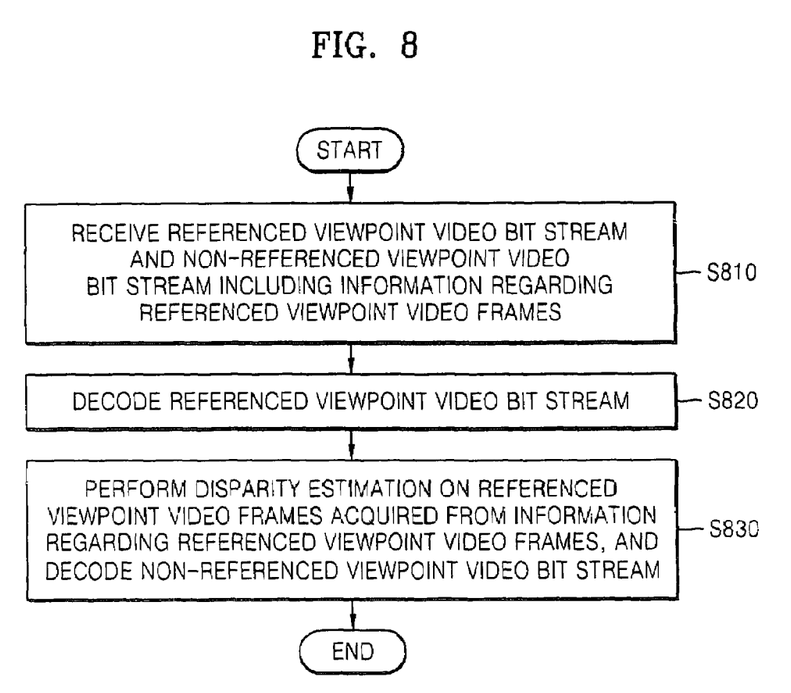
FIG. 8 is a flowchart illustrating a multi-view video decoding method of providing uniform picture quality, according to an exemplary embodiment of the present invention.

FIG. 8 is a flowchart illustrating a multi-view video decoding method of providing uniform picture quality, according to an embodiment of the present invention.

Referring to FIG. 8, in operation S810, a referenced viewpoint video bit stream and an non-referenced viewpoint video bit stream including information regarding referenced viewpoint video frames are received. If the referenced viewpoint video bit stream and the non-referenced viewpoint video bit stream are transmitted after being multiplexed, an operation of demultiplexing received multi-view video bit streams to obtain a referenced viewpoint video bit stream and an non-referenced viewpoint video bit stream can be further performed prior to operation S810.

Then, in operation S820, the referenced viewpoint video bit stream is decoded. In operation S830, disparity estimation is performed on the referenced viewpoint video frames indicated by the information regarding the referenced viewpoint video frames, thereby decoding the non-referenced viewpoint video bit stream.

The information regarding the referenced viewpoint video frames included in the non-referenced viewpoint video bit stream is changed on the basis of a predetermined amount of time. The predetermined amount of time may be a predetermined time unit, a sequence unit, a GOP unit, or a picture unit. As such, by changing referenced viewpoint video frames per a predetermined amount of time and performing disparity estimation on the changed referenced viewpoint video frames, it is possible to provide multi-view video having a uniform picture quality deterioration degree with respect to an arbitrary viewpoint video frame among received multi-view video frames.

Figure 9:
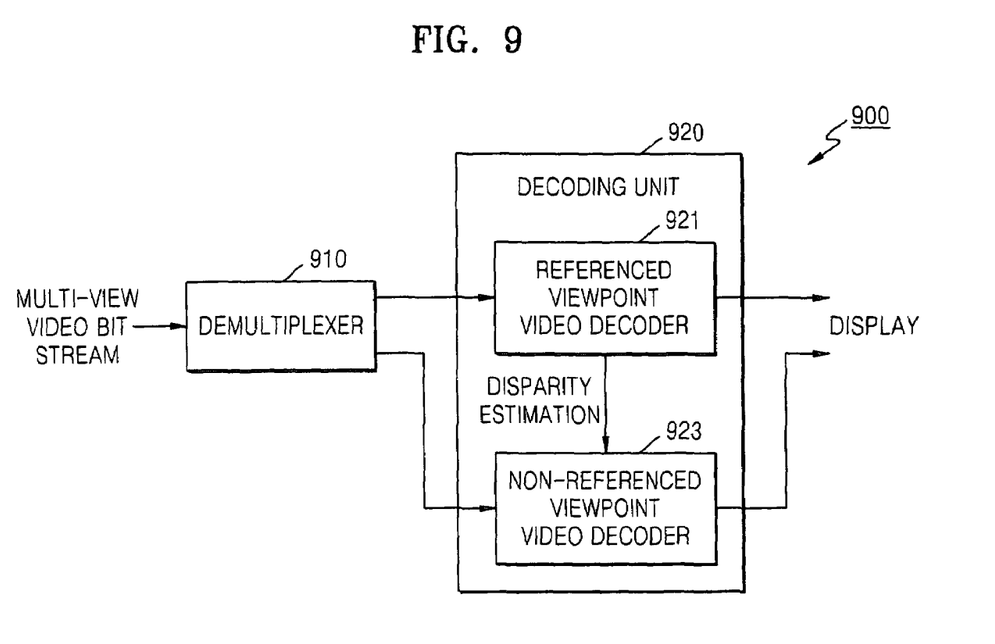
FIG. 9 is a block diagram of a multi-view video decoding apparatus for providing uniform picture quality, according to an exemplary embodiment of the present invention.

FIG. 9 is a block diagram of a multi-view video decoding apparatus 900 for providing uniform picture quality, according to an embodiment of the present invention.

The multi-view video decoding apparatus 900 includes a demultiplexer 910 and a decoding unit 920. The multi-view video decoding apparatus 900 may be installed in a free view television (FTV) or a three-dimensional television (3DTV).

If a referenced viewpoint video bit stream and a non-referenced viewpoint video bit stream including information regarding referenced viewpoint video frames are multiplexed and transmitted, the demultiplexer 910 demultiplexes the multiplexed multi-view video bit streams to a referenced viewpoint video bit stream and a non-referenced viewpoint video bit stream.

The decoding unit 920 includes a referenced viewpoint video decoder 921 for receiving and decoding the referenced viewpoint video bit stream and a non-referenced viewpoint video decoder 923 for receiving and decoding the non-referenced viewpoint video bit stream. The non-referenced viewpoint video decoder 923 performs disparity estimation on the referenced viewpoint video frames indicated by the information regarding the referenced viewpoint video frames such as referenced viewpoint identifiers, when decoding the non-referenced viewpoint video bit stream. The information regarding the referenced viewpoint video frames included in the non-referenced viewpoint video bit stream changes on the basis of a predetermined amount of time. Accordingly, a user, which uses a 3DTV or FTV including the multi-view video decoding apparatus 900, can receive video having uniform picture quality with respect to time for all viewpoints which he or she selects.

The invention can also be embodied as computer readable codes on a computer readable recording medium. Functional programs, codes, and code segments for accomplishing the present invention can be easily construed by programmers skilled in the art to which the present invention pertains. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, there is provided a method for encoding and decoding multi-view video so that degrees of picture quality deterioration at different viewpoints are uniformly distributed with respect to a long time.

Accordingly, when a video frame taken at an arbitrary viewpoint is selected from among received multi-view video frames and decoded, the video frame can have a uniform degree of picture quality deterioration compared to video frames taken at different viewpoints, without remaining with a higher or lower degree of picture quality deterioration degree compared to that of an original video frame at the corresponding viewpoint.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for encoding multi-view video comprising:
selecting, by a computer system, a set of referenced viewpoint video frames referred to by different viewpoint video frames, from among received multi-view video frames;
encoding the multi-view video on the basis of the set of referenced viewpoint video frames;
determining whether a condition for changing the set of referenced viewpoint video frames is satisfied;
if the condition is satisfied, changing the set of referenced viewpoint video frames; and
encoding the multi-view video on the basis of the changed set of referenced viewpoint video frames,
wherein the encoding the multi-view video comprises encoding the set of referenced viewpoint video frames and encoding the set of non-referenced viewpoint video frames not selected as the set of referenced viewpoint video frames.

2. The method of claim 1, wherein the determination of whether the condition for changing the set of referenced viewpoint video frames is satisfied is performed by determining whether a predetermined amount of time elapses.

3. The method of claim 2, wherein the predetermined amount of time is a predetermined time unit, a sequence unit, a Group of Pictures (GOP) unit, or a picture unit.

4. The method of claim 1, wherein the changing of the set of the referenced viewpoint video frames comprises sequentially or arbitrarily changing the set of referenced viewpoint video frames.

5. The method of claim 1, wherein
the encoding the set of referenced viewpoint video frames comprises encoding the set of referenced viewpoint video frames using only video information regarding their own viewpoints and creating a referenced viewpoint video bit stream, and
the encoding the set of non-referenced viewpoint video frames comprises encoding a set of non-referenced viewpoint video frames not selected as the set of referenced viewpoint video frames using disparity vectors with respect to the set of the referenced viewpoint video frames, and creating a non-referenced viewpoint video bit stream.

6. The method of claim 5, wherein the creating of the non-referenced viewpoint video bit stream comprises adding information regarding referenced viewpoint video frames referred to by respective non-referenced viewpoint video frames to the non-referenced viewpoint video bit stream, wherein the information regarding the referenced viewpoint video frames comprises a referenced viewpoint identifier.

7. The method of claim 5, further comprising multiplexing and transmitting the referenced viewpoint video bit stream and the non-referenced viewpoint video bit stream.

8. A non-transitory computer-readable recording medium storing a program for executing the method of claim 1.

9. The method of claim 1, wherein the
encoding of the set of referenced viewpoint video frames comprises using video information regarding respective viewpoints of each video frame in the set of referenced viewpoint video frames, and
wherein the encoding of the set of non-referenced viewpoint video frames not selected as the set of referenced viewpoint video frames comprises using disparity vectors with respect to the set of the referenced viewpoint video frames.

10. The method of claim 1, wherein the encoding of the set of non-referenced viewpoint video frames not selected as the set of referenced viewpoint video frames comprises using disparity vectors with respect to the set of the referenced viewpoint video frames.

11. An apparatus for encoding multi-view video comprising:
a referenced viewpoint video selecting unit which selects a set of referenced viewpoint video frames referred to by different viewpoint video frames, from among received multi-view video frames;
an encoding unit which encodes the multi-view video on the basis of the set of referenced viewpoint video frames; and
a condition determining unit which determines whether a condition for changing the set of referenced viewpoint video frames is satisfied,
wherein, if the condition determining unit determines that the condition is satisfied, the referenced viewpoint video selecting unit changes the set of referenced viewpoint video frames, and the encoding unit encodes the multi-view video on the basis of the changed set of referenced viewpoint video frames,
wherein the encoding unit comprises a referenced viewpoint video encoder which encodes the set of referenced viewpoint video frames and a non-referenced viewpoint video encoder which encodes the set of non-referenced view point video frames not selected as the set of referenced viewpoint video frames.

12. The apparatus of claim 11, wherein the condition determining unit determines whether the condition is satisfied, by determining whether a predetermined amount of time elapses.

13. The apparatus of claim 12, wherein the predetermined amount of time is a predetermined time unit, a sequence unit, a GOP unit, or a picture unit.

14. The apparatus of claim 11, wherein the referenced viewpoint video selecting unit changes the set of the referenced viewpoint video frames sequentially or arbitrarily when changing the set of referenced viewpoint video frames.

15. The apparatus of claim 11, wherein
the referenced viewpoint video encoder encodes the set of referenced viewpoint video frames, using only video information regarding their own viewpoints, and creating a referenced viewpoint video bit stream; and
the non-referenced viewpoint video encoder encodes a set of non-referenced video frames not selected as the set of referenced viewpoint video frames, using disparity vectors with respect to the set of referenced viewpoint video frames, and which creates non-referenced viewpoint video bit stream.

16. The apparatus of claim 15, wherein the non-referenced viewpoint video encoder adds information regarding referenced viewpoint video frames referred to by respective non-referenced viewpoint video frames to the non-referenced viewpoint video bit stream when creating the non-referenced viewpoint video bit stream, wherein the information regarding the referenced viewpoint video frames comprises a referenced viewpoint identifier.

17. The apparatus of claim 15, further comprising a multiplexer which multiplexes and transmits the referenced viewpoint video bit stream and the non-referenced viewpoint video bit stream.

18. A method for decoding multi-view videos, comprising:

receiving a referenced viewpoint video bit stream and a non-referenced viewpoint video bit stream including information regarding referenced viewpoint video frames;

decoding the referenced viewpoint video bit stream; and performing, by a computer system, disparity estimation on the referenced viewpoint video frames indicated by the information regarding the referenced viewpoint video frames, decoding the non-referenced viewpoint video bit stream based on the performing of the disparity estimation, wherein the information regarding the referenced viewpoint video frames, included in the non-referenced viewpoint video bit stream, comprises referenced viewpoint identifiers of the referenced viewpoint video frames referred to by respective non-referenced viewpoint video frames, and is changed on the basis of a predetermined amount of time.

19. The method of claim 18, wherein the predetermined amount of time is a predetermined time unit, a sequence unit, a GOP unit, or a picture unit.

20. A non-transitory computer-readable recording medium storing a program for executing the method of claim 18.

21. An apparatus for decoding multi-view video, comprising:

a referenced viewpoint video decoding unit which receives and decodes a referenced viewpoint video bit stream; and a non-referenced viewpoint video decoding unit which receives a non-referenced viewpoint video bit stream including information regarding referenced viewpoint video frames, and performs disparity estimation on the referenced viewpoint video frames indicated by the information regarding the referenced viewpoint video frames, thereby decoding the non-referenced viewpoint video bit stream, wherein the information regarding the referenced viewpoint video frames included in the non-referenced viewpoint video bit stream comprises referenced viewpoint identifiers of the referenced viewpoint video frames referred to by respective non-referenced viewpoint video frames, and is changed on the basis of a predetermined amount of time.

22. The apparatus of claim 21, wherein the predetermined amount of time is a predetermined time unit, a sequence unit, a GOP unit, or a picture unit.

* * * * *